(12) United States Patent
Courcambeck et al.

(10) Patent No.: US 8,782,367 B2
(45) Date of Patent: Jul. 15, 2014

(54) MEMORY AREA PROTECTION CIRCUIT

(75) Inventors: Stéphan Courcambeck, Plan de Cuques (FR); Albert Martinez, Bouc Bel Air (FR); Jean Nicolai, Chateauneuf le Rouge (FR); William Orlando, Peynier (FR)

(73) Assignee: STMicroelectronics S.A., Montrouge (FR)

( * ) Notice: Subject to any disclaimer, the term of this patent is extended or adjusted under 35 U.S.C. 154(b) by 722 days.

(21) Appl. No.: 11/958,958

(22) Filed: Dec. 18, 2007

(65) Prior Publication Data

US 2008/0155188 A1 Jun. 26, 2008

(30) Foreign Application Priority Data

Dec. 20, 2006 (FR) ..................................... 06 55694

(51) Int. Cl.
*G06F 12/00* (2006.01)

(52) U.S. Cl.
USPC .......................................... 711/163; 711/108

(58) Field of Classification Search
USPC .................................. 711/108, 163
See application file for complete search history.

(56) References Cited

U.S. PATENT DOCUMENTS

| 5,142,676 | A | | 8/1992 | Fried et al. | |
|---|---|---|---|---|---|
| 5,559,989 | A | | 9/1996 | Sourgen et al. | |
| 5,649,139 | A | * | 7/1997 | Weinreb et al. | 711/202 |
| 5,848,435 | A | * | 12/1998 | Brant et al. | 711/152 |
| 5,991,858 | A | * | 11/1999 | Weinlander | 711/163 |
| 6,212,604 | B1 | * | 4/2001 | Tremblay | 711/125 |
| 6,345,347 | B1 | * | 2/2002 | Biran | 711/163 |
| 7,219,187 | B1 | * | 5/2007 | Khanna et al. | 711/108 |
| 7,287,140 | B1 | * | 10/2007 | Asanovic et al. | 711/163 |
| 8,112,614 | B2 | * | 2/2012 | Nickolls et al. | 712/22 |
| 2001/0021966 | A1 | | 9/2001 | Kawasaki et al. | |
| 2003/0135691 | A1 | | 7/2003 | Srinivasan | |
| 2003/0212871 | A1 | * | 11/2003 | Suzuki et al. | 711/164 |
| 2004/0193755 | A1 | * | 9/2004 | Safranek et al. | 710/22 |
| 2007/0283125 | A1 | * | 12/2007 | Manczak et al. | 711/207 |

OTHER PUBLICATIONS

French Search Report from French Patent Application No. 06/55694 filed Dec. 20, 2006.

* cited by examiner

*Primary Examiner* — April Y Blair
*Assistant Examiner* — Prasith Thammavong
(74) *Attorney, Agent, or Firm* — Wolf, Greenfield & Sacks, P.C.

(57) ABSTRACT

A circuit for controlling the access to at least one area of a memory accessible by a program execution unit, including a first instruction address input; at least one second data address input, the addresses coming from the execution unit; at least one function of correlation of these addresses; and at least one output of a bit for validating the fulfilling of conditions set by the correlation function.

18 Claims, 5 Drawing Sheets

MEMORY AREA PROTECTION CIRCUIT

BACKGROUND OF THE INVENTION

1. Field of the Invention

The present invention relates to the field of microprocessors and, more specifically, to rights of access to memory areas according to the applications (programs) executed by a central processing unit.

2. Discussion of the Related Art

Patent application US-A-2005/0028004 describes a device for controlling the access to a memory by a central processing unit executing different applications. The device detects whether the central processing unit is driven by the operating system (OS mode) or executes another application. In this last case, a circuit, interposed on the instruction bus, verifies that the instructions transmitted to the central processing unit over this bus originate from a memory area referenced in a table upon loading of this application.

SUMMARY OF THE INVENTION

The present invention aims at overcoming all or part of the disadvantages of known systems for managing the rights of access to a memory by a central processing unit executing different programs.

According to a first aspect, the present invention more specifically aims at preventing unauthorized applications from accessing to memory areas reserved for other applications.

According to this first aspect, the present invention also aims at a solution which is transparent to the operating system, that is, which replaces or comes as a complement to control mechanisms of the operating system.

According to a second aspect, the present invention more specifically aims at the loading of secured applications in an execution memory of a central processing unit.

According to this second aspect, the present invention also aims at a solution that can be combined with the first aspect.

To achieve all or part of these objects as well as others, the present invention provides a circuit for controlling the access to at least one area of a memory accessible by a program execution unit, comprising:

a first instruction address input;

at least one second data address input, the addresses coming from the execution unit;

at least one function of correlation of these addresses; and at least one output of a bit for validating the fulfilling of conditions set by the correlation function.

According to an embodiment of the present invention, the correlation function is obtained by a content-addressable memory receiving said instruction and data addresses and providing correspondence bits to a wired logic.

According to an embodiment of the present invention, said content-addressable memory comprises as many lines as there are instruction address ranges that the circuit is intended to control.

According to an embodiment of the present invention, said content-addressable memory comprises several data address correspondence tables.

According to an embodiment of the present invention, said content-addressable memory comprises at least one table of correspondence of peripherals accessible by each instruction address range.

According to an embodiment of the present invention, said content-addressable memory comprises a table of identification of the program corresponding to each instruction range.

According to an embodiment of the present invention, the correlation function is activated by a bit identifying an instruction of access to the memory area to be monitored.

According to an embodiment of the present invention, the correlation function takes into account an operating mode of the execution unit.

According to an embodiment of the present invention, the correlation function is parameterizable.

According to an embodiment of the present invention, the correlation function is parameterized on each loading of a program into a program execution memory associated with the execution unit.

The present invention also provides a computer system comprising such a circuit.

The foregoing and other objects, features, and advantages of the present invention will be discussed in detail in the following non-limiting description of specific embodiments in connection with the accompanying drawings.

DETAILED DESCRIPTION

Figure 1:
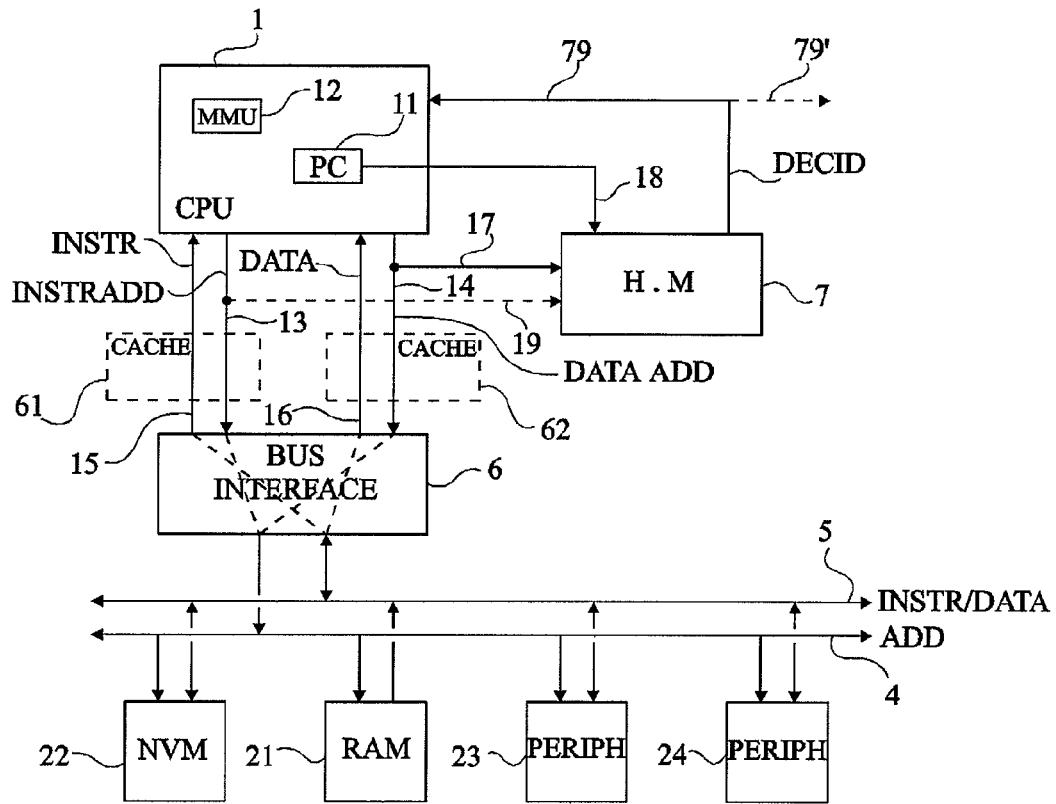
FIG. 1 is a block diagram of a system equipped with a circuit for controlling the accesses to memory areas according to an embodiment of the present invention.

The same elements have been designated with the same reference numerals in the different drawings. For clarity, only those steps and elements which are necessary to the understanding of the present invention have been shown in the drawings and will be described hereafter. In particular, the operation mechanisms of a central processing unit have not been detailed, the present invention being compatible with any usual central processing unit. Further the actual addressing mechanisms of the memories controlled by the present invention have not been detailed, the present invention being here again compatible with usual memories.

The first aspect will be described hereafter in relation with an example of application to a central processing unit on which an operating system executes, as well as various applications (programs) for which a specific memory area is desired to be reserved. It however more generally applies to any unit of execution of one or several programs using one or several memories for which it is desired to make sure that a given program only uses data or instructions from the memory which are authorized for it. "Program" is used to designate any executable instruction sequence, whatever its size and destination. Reference will now interchangeably be made to the terms "program" or "application". "Memory area" is used to designate an assembly of memory cells addressable by a digital code and representing all or part of one or several memory circuits exploited by the processing unit.

The reasons for which the areas of a memory to which an application is accessing may be desired to be controlled are multiple. For example, if the application handles data, the use of which by another application executing on the same processing unit is desired to be forbidden (for example, secret keys used in cryptography). Another example relates to an application (for example, downloaded) which is not trusted and for which it is desired to avoid that it should "spy" on other applications having access to the same physical memories.

FIG. 1 is a block-diagram of an example of a system according to an embodiment of the present invention. A program execution processor or unit 1 (for example, a central processing unit—CPU) exploits various peripherals 2 sharing address (ADD) and data (INSTR/DATA) buses 4 and 5. In the illustrated example, a volatile memory 21 (RAM) and a non-volatile memory 22 (NVM) are connected to buses 4 and 5 as well as two other peripherals 23 and 24 (PERIPH), for example, a screen, a keyboard, another processor, etc. Direct connections (for example, of control or state control signals) not shown between unit 1 and some peripherals may also exist. Memory 21 for example is the execution memory used by unit 1, that is, the memory into which the programs are loaded when they are executed. Memory 22, for example, is the mass storage used by unit 1, that is, the memory in which the programs are stored when they are not being executed. Data are of course also stored in memories 21 and 22.

An interface circuit 6 (BUS INTERFACE) is interposed between central processing unit 1 and buses 4 and 5. This circuit behaves as an interface between unit 1 and peripherals 2. Unit 1 sends instruction and data requests by providing instruction addresses INSTR ADD (connection 13) and data addresses DATA ADD (connection 14) to circuit 6. Said circuit combines these requests to present the addresses on address bus 4. The data (be they instructions INSTR or actual data DATA) returned by the concerned peripheral 22, 23, 23 or 24 (the memories being here assimilated to peripherals) over bus 5 are identified by controller 6 which dispatches them between the instruction accesses (connection 15) and the data accesses (connection 16) of unit 1. The addresses provided by unit 1 to circuit 6 are physical addresses, possibly obtained from virtual addresses by a conversion unit 12 (MMU) generally contained in unit 1.

A control circuit 7 (H.M.—Hardware Monitor) intercepts the instruction addresses INSTR ADD and data addresses DATA ADD. It intercepts (connection 17) the data addresses between unit 1 and circuit 6. As for the instruction addresses, either they are directly provided thereto by program counter 11 (connection 18), or it intercepts them (connection 19 in dotted lines) between unit 1 and controller 6.

Cache memories 61 and 62 (CACHE) shown in dotted lines may be interposed between the data (address and data) and instruction (address and instruction) accesses and interface circuit 6.

Circuit 7 observes all the address transactions to verify that certain programs (for example, cryptography algorithms) or that certain data (for example, secret keys or access right data) are only accessible by determined programs. Circuit 7 provides at least one signal (DECID) identifying a possible violation of access, for example, to unit 1 (connection 79) or to other elements of the computer equipment (connection 79' in dotted lines).

Figure 6:
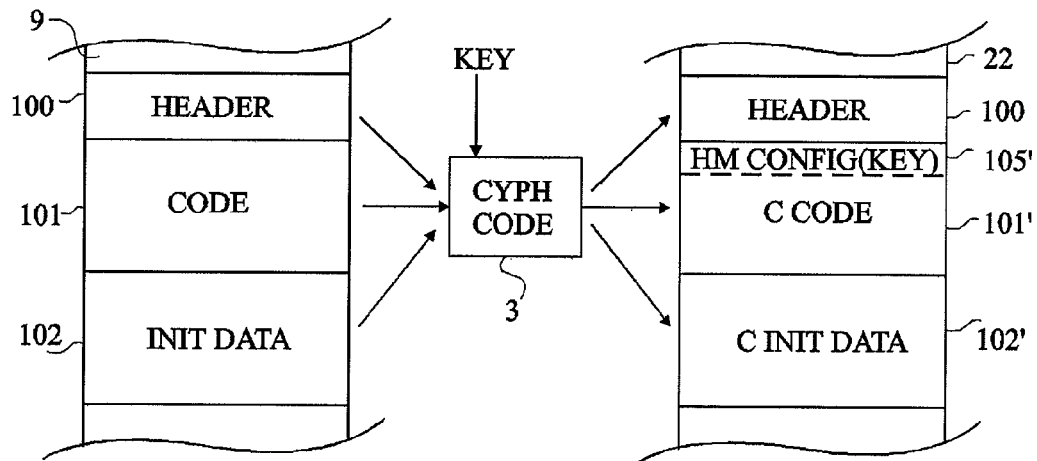
FIG. 6 schematically illustrates an example of processing of a program according to an embodiment of the second aspect of the present invention.

Preferably, all or part of the loading of the programs into the execution RAM having its access controlled by device 7 is performed by a specific so-called trusted program. This, for example, enables avoiding that a so-called "open" exploitation system which cannot be trusted can have access to a critical part of this program (keys, codes, etc.). Loading examples will be subsequently illustrated in relation with the second aspect of the present invention (FIG. 6 and the following).

The first aspect will be described hereafter in relation with an example of control of the access to different areas of a same program execution volatile memory, but these areas may belong to different memories, be they volatile or not.

Regarding the organization of the controlled memory (or memories), a given program, for example, has access to one or several of the following categories of areas:

an instruction area which represents its executable code;

a private data area (for example, of cyphering or access keys), that is, an area to which only this program must be able to access;

a so-called reserved data area, intended to contain data exchanged between the program and the operating system (for example, parameters on calls to the operating system);

a so-called sharing area, intended to contain data shared by several programs without for all this being necessarily open to any application executed by the central processing unit;

a so-called open, that is, uncontrolled, area.

According to the field of application of the present invention, one or several or the above area categories may be controlled by circuit 7.

Further, the access to certain peripherals (for example, a cryptoprocessor, a non-volatile memory, etc.) may be reserved to one or several applications.

Figure 2:
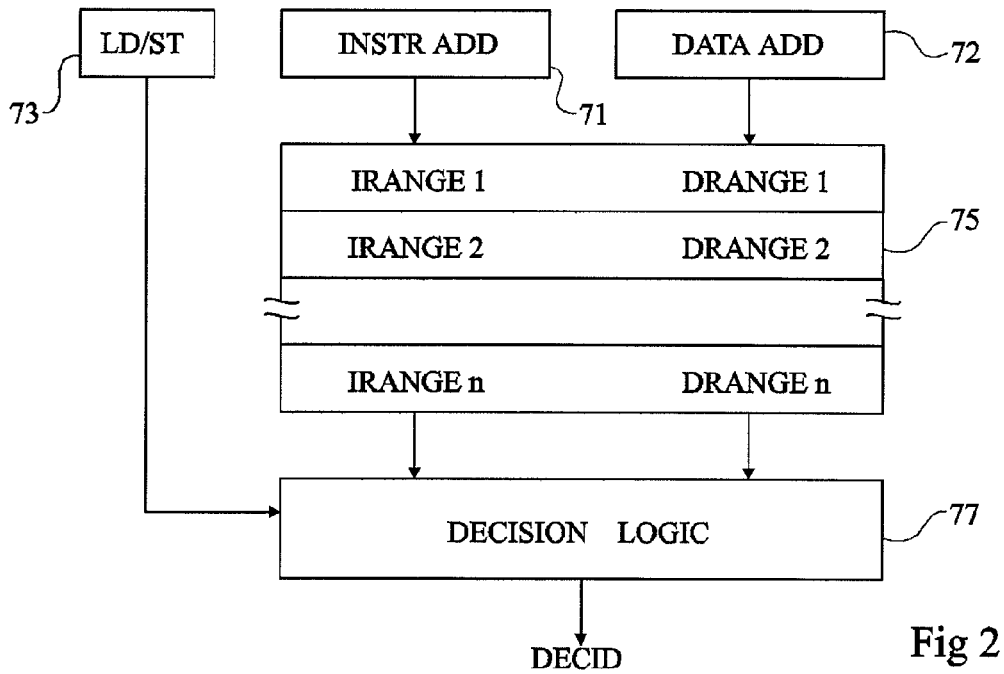
FIG. 2 is a functional diagram of a control circuit according to an embodiment of a first aspect of the present invention.

FIG. 2 is a functional block-diagram of an embodiment of an access control circuit 7 according to the first aspect.

Circuit 7, preferably external to central processing unit 1, actually intercepts each transaction which appears on address buses 14, and 13 or 18. The access control comprises identifying the program which requires access to the memory, for example based on the address of the read/write instruction, to determine or verify the address range IRANGE from which this instruction originates, and verifying that the data DATA ADD called by this instruction corresponds to an address range DRANGE to which this program has access.

Preferably, device 7 detects that an instruction of a program being executed is an instruction of access to the memory to be monitored (for example, a read or write instruction). It then verifies not only based on the instruction address (INSTR ADD) that said instruction originates from an area (IRANGE) in the memory corresponding to the concerned program, but also that the address (DATA ADD) of the data to which this program is desired to have access also belongs to an authorized address range (DRANGE).

The successive addresses of instructions INSTR ADD of the program being executed are stored in a temporary storage element (for example, a register 71) while the possible data addresses DATA ADD called by the instruction are stored in a temporary storage element (for example, a register 72). In the example of FIG. 2, it is assumed that n data address ranges (DRANGE1 to DRANGEn) are controlled from n instruction address ranges (IRANGE1 to IRANGEn). Of course, several programs can have access to same address ranges and a same program can have several instruction ranges.

The authorized (or forbidden) address ranges IRANGE and DRANGE are stored in lines of a memory 75 to establish a correspondence between the current address contained in one of registers 71 and 72 and the corresponding authorized address ranges. Preferably, memory 75 is a so-called associative memory, also called content-addressable memory (CAM). Such a memory stores one or several data or data range tables and looks to see whether input data are contained in the table(s). Functionally, this forms an engine for searching a value from one or several tables. Memory 75 generally provides the address where it has found the correspondence or a bit indicative of the fact that a correspondence has been found between the input data and one of the stored values. In the example of the present invention, the input data and the stored values correspond to addresses in the controlled-access memory. An example of a content-addressable memory structure is described in article "Content-Addressable Memory (CAM) Circuit and Architectures: A tutorial and Survey" by Kostas Pagiamtzis and Ali Sheikholeslami, published in March 2006 in IEEE Journal of Solid State Circuits, vol. 41, no 3.

The comparisons (correspondence bits provided by memory 75) between the current instruction and data addresses and the different ranges are preferentially exploited by a circuit 77 in wired logic (DECISION LOGIC) which provides, preferentially in the form of a decision bit DECID, the indication of a possible violation of an access rule set by the decision logic.

The identification of a reading from or of a loading into the memory (or memories) having controlled areas translates as a bit LD/ST stored in a storage element (for example, a register 73) which activates logic circuit 77. This identification is performed, for example, by central processing unit 1 or by a decoding of the instruction in parallel with that performed by unit 1.

Preferably, circuit 7 (memory 75) comprises at least two tables, one for the address ranges of the program instructions to be monitored and one for the address ranges of the corresponding data. Circuit 7 may comprise several data tables according to the type of data to be monitored (reserved, shared, forbidden, etc. data) as well as other tables for refining the control possibilities (authorized peripherals, data type, etc.).

Number n of lines of the tables of memory 75 depends on the maximum number of programs that the circuit can monitor at once.

The tables of circuit 7 can be filled in several ways.

For example, a program for configuring a line in the table is executed on powering-on of the device containing the system of the present invention. In this case, the programs which are desired to be monitored should be installed (for example, loaded into the central execution memory) before the operating system has started.

According to another example where the programs are installed after the starting of the operating system (which is more frequent), an installation program executes first (at least before a critical application) and assigns itself one of the tables lines to be protected for the rest of the session. The other programs are installed by this installation program which, since it is protected, does not risk being cracked. "Installation of a program" is here used to designate the loading thereof from a mass storage (for example, a computer's hard disk, a CDROM) into an execution memory (for example, a computer's RAM). It is not the installation of a software from a CDROM to a hard disk for a subsequent execution.

According to another example, a processor is dedicated to the program installation (loading). This processor is secure in that the installation programs that it executes are neither accessible, nor likely to be modified.

According to another example, the central processing unit comprises an additional operating mode with respect to user and supervisor levels, which is dedicated to the programming of circuit 7. This third mode then executes from the ROM of an integrated system (SOC—system on chip) comprising at least central processing unit 1 and circuit 7.

According to another example which will be described hereafter in relation with FIG. 6 et seq., the programs are loaded by a mechanism using a secure operating system.

Figure 3:
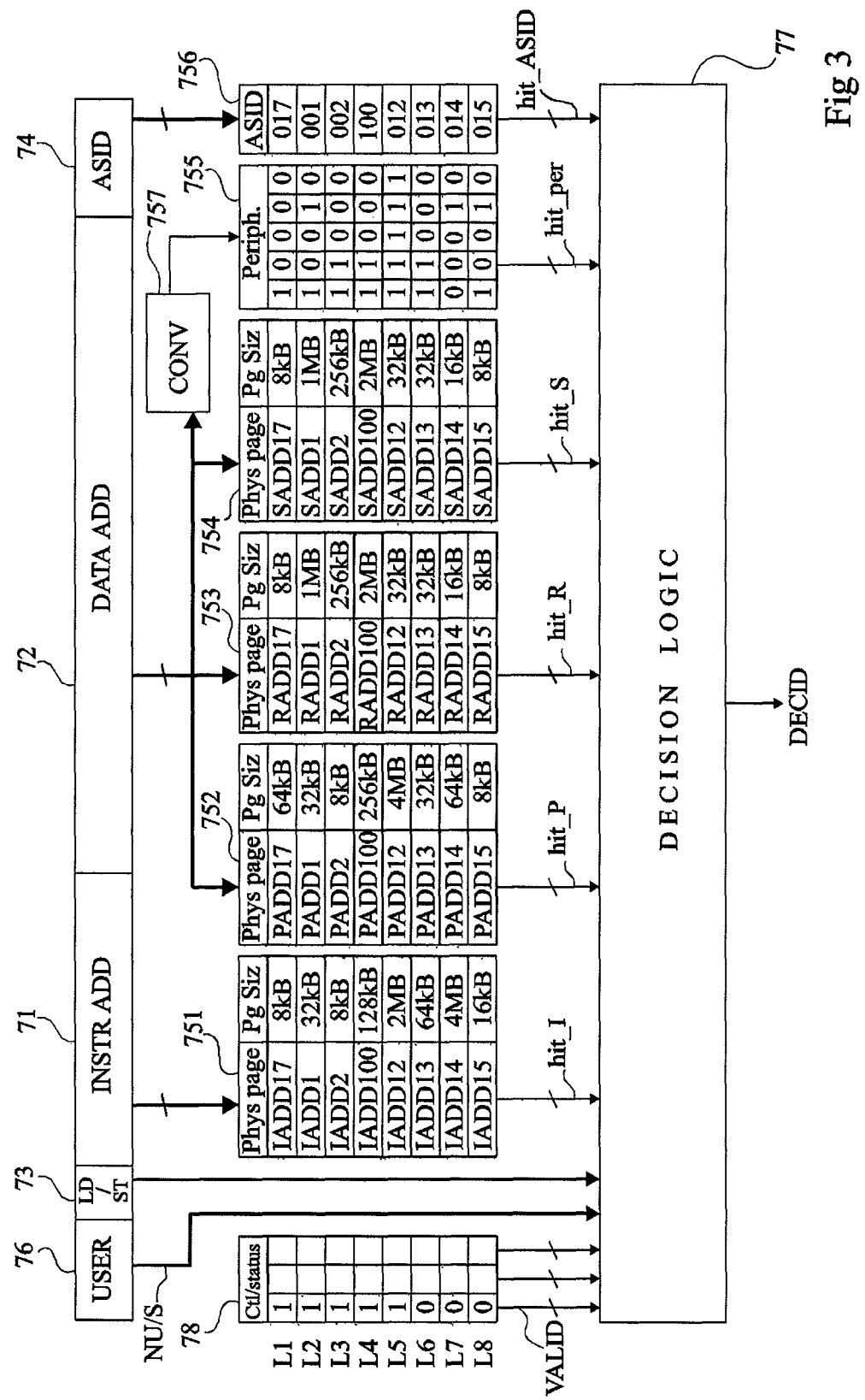
FIG. 3 is a more detailed functional block-diagram of a control circuit according to an embodiment of the present invention.

FIG. 3 is a more detail block-diagram of a circuit 7 according to an embodiment of the first aspect.

A circuit 7 of six tables 751 to 756 of eight lines, each respectively containing the instruction address ranges, data address ranges of three categories, authorized peripheral selectors, and an ASID identifier (for example, arbitrarily, 017, 001, 002, 100, 012, 013, 014, and 015) of the executed program, is assumed. For example, a first table 752 of data addresses identifies the privates addresses PADD of the data only accessible when the concerned program executes, a second table 753 identifies the reserved data RADD exchanged between the program and the operating system, and a third table 754 identifies shared data SADD. The current program identifier ASID is stored in a temporary storage element (for example, a register 74). This identifier is used, for example, to recognize what areas are called by the operating system on account of the concerned program. Further, logic circuit 77 also takes into account the operating mode of the central processing unit (for example, the user mode USER with respect to the supervisor mode) by exploiting a bit USER stored in a storage element (for example, a register 76). In the illustrated example, register 76 provides a bit NU/S active in supervisor mode. Finally, a table 78 of configuration of circuit 7 stores, for each line L1 to L8, control or configuration bits (Ctl/status) conditioning the operation of logic block 77. For example, one of the bits (VALID) activates the corresponding line when said line is filled and deactivates its interpretation otherwise. Another bit can condition the interpretation rule of one of several lines by configuring logic block 77 as will be better understood hereafter.

The content-addressable memory or memories provide logic block 77 with at least as many correspondence bits as the tables comprise lines, preferably either the same number or twice the number of correspondence bits. In other words, each table 751 to 756 provides, for each of its lines, at least one bit hit1_I to hit8_I, hit1_P to hit8_P, hit1_R to hit8_R, hit1_S to hit8_S, hit1_per to hit8_per, and hit1_ASID to hit8_ASID, indicative of whether the condition set by this line is respected. As a variation, each table provides two correspondence bit respectively activated in case this condition is respected and is not respected.

In the example of FIG. 3, the address ranges are identified by the memory page (Phys Page) to which they refer (in practice, the beginning address IADD17, IADD1, IADD2, IADD100, IADD12, IADD13, IADD14, IADD15, PADD17, PADD1, PADD2, PADD100, PADD12, PADD13, PADD14, PADD15, RADD17, RADD1, RADD2, RADD100, RADD12, RADD13, RADD14, RADD15, SADD17, SADD1, SADD2, SADD100, SADD12, SADD13, SADD14 and SADD15) and by the size (Pg Siz) in kilobytes or megabytes of the area from the beginning of the page. According to another example, not shown, the address areas are defined by their beginning and end addresses and the table exploitation uses a comparator to verify that a current address is comprised between the two limiting addresses. This embodiment, however, requires two lines of the content-addressable memory per memory area. According to another example still, the content-addressable memory manages three possible states of the bits, that is, active, inactive, and don't care, then defining, by the don't care states, address ranges.

Peripheral definition table 755 (Periph.) has the form of a bit table in which each column identifies a peripheral of the system and the respective states of the bits condition the access according to whether the calling or called peripheral is authorized. The current peripheral preferably is identified based on the current data address (DATA ADD). For example, an additional conversion table (CONV) 757 contains the addresses reserved to the different peripherals (which are generally set on installation of the peripherals or on design of the computer equipment) and associates therewith a column number from table 755. Table 757 which receives addresses DATA ADD then provides a single bit to table 755. Table 757 for example is another content-addressable memory or is functionally obtained by bit masking with a combinatory logic. As a variation, table 755 directly contains the address ranges of the peripherals.

The combinatory logic (block 77) for exploiting the results provided by the tables of the content-addressable memory defines in a way one or several rules that the access control circuit is in charge of verifying to indicate a possible violation by an application.

Figure 4:
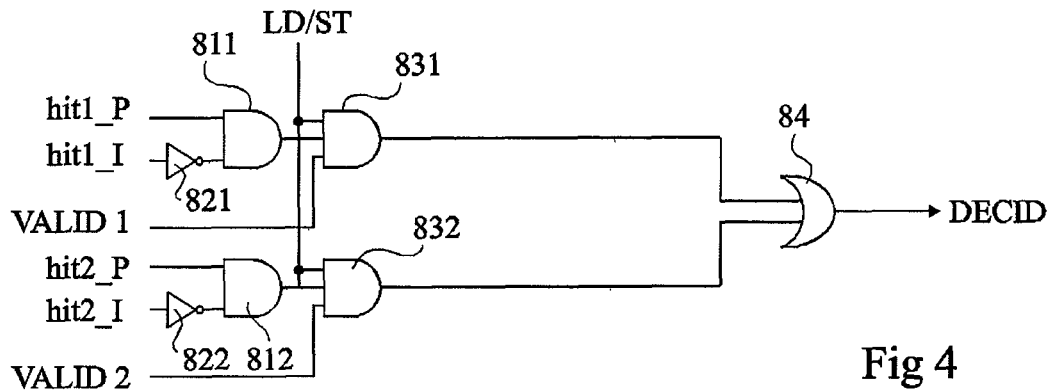
FIG. 4 is an example of a logic decision circuit of a control circuit according to an embodiment of the present invention.

FIG. 4 shows an example of a combinatory logic for exploiting the results of a content-addressable memory of a circuit 7.

According to this example, a single rule is monitored. This rule comprises verifying that only the first two programs 017 and 001 call their respective private data. The logic verifies, for each of the first two lines of tables 751 and 752 assigned to the first two programs, whether the rule is actually respected, then combines the two results to provide the security violation result. To achieve this, correspondence bit hit1_P of the first line of table 752 is combined by an AND-type gate 811 with the inverse (inverter 821) of correspondence bit hit1_I of the first line of table 751. Similarly, correspondence bit hit2_P of the second line of table 752 is combined by an AND-type gate 812 with the inverse (inverter 822) of correspondence bit hit1_I of the second line of table 751. The respective outputs of gates 811 and 812 are combined by AND-type gates 831 and 832 with three inputs having second inputs receiving bits VALID1 and VALID2 and having third inputs receiving bit LD/ST indicative of a read or write instruction in the monitored memory. Assuming that the active bits are at state 1, the output of gate 811 or 812 is only at state 1 if the current data address DATA ADD is in the private range of data of the concerned program (bit hit1_P or hit2_P at state 1) and the instruction address INSTR ADD is not in the range of instruction addresses of the concerned program (bit hit1_I or hit2_I at state 0). An output of gate 811 or 812 at state 1 indicates, provided that the monitoring of the concerned program is validated (bit VALID1 or VALID2) at state 1 and that the instruction is an instruction of access to the memory (bit LD/ST at state 1), a violation of the access rule. This violation is indicated by a state 1 at the output of gate 831 or 832. The respective outputs of gates 831 and 832 are combined by an OR-type gate 84 having its output conditioning decision DECID of logic block 77. The use of this decision bit may be a blocking of the system, the triggering of an error processing interrupt or any other measure adapted to the application.

As a variation, the individual results of the rules are provided by decision logic 77 for purposes of finer analysis of possible violations. Preferably, this analysis is complementary with a blocking, especially if it is a rule of access to private data.

The combinatory logic may respect an identical architecture for all table lines and be programmable by configuration bits (table 78). These bits are preferably set by the loading program on loading of each application. In the simplified example of FIG. 4, the configuration bit amounts to a bit for validating the rule for each application.

Figure 5:
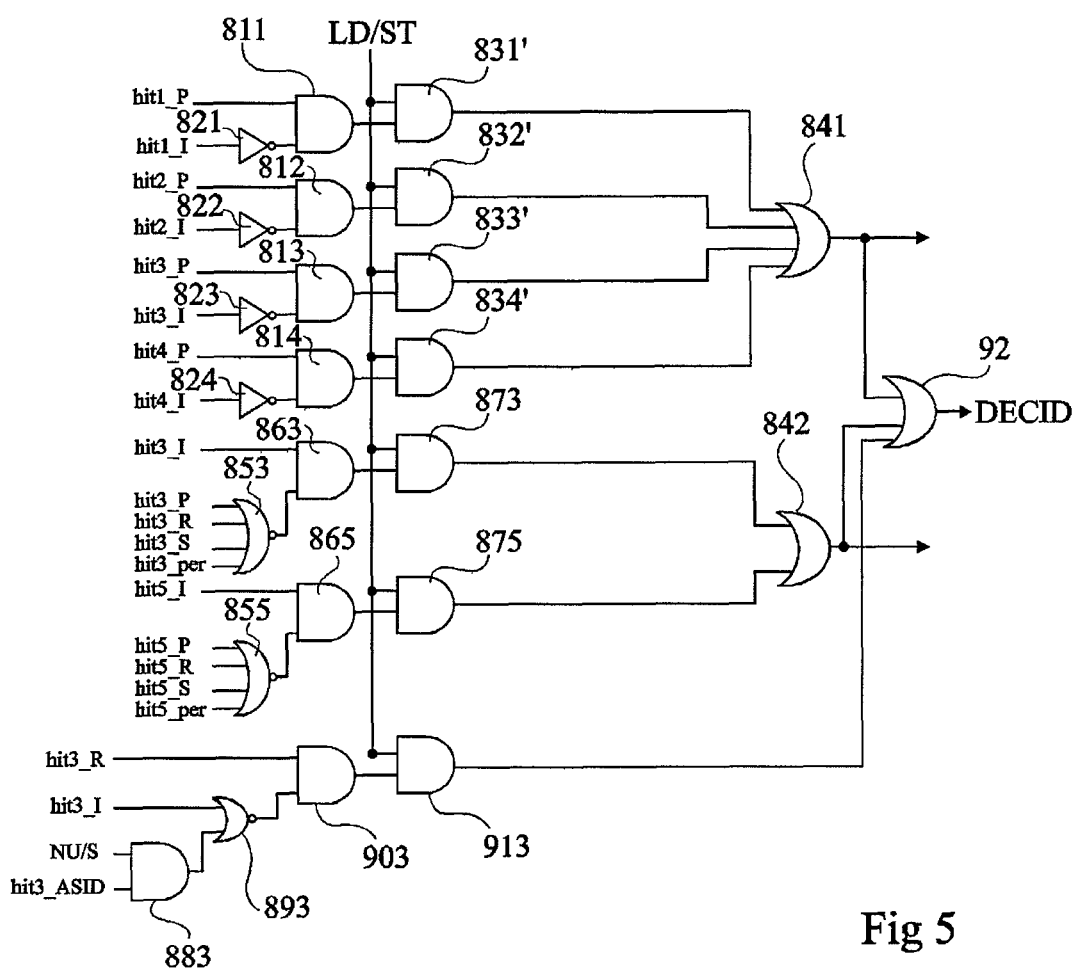
FIG. 5 is another example of a logic circuit of a control circuit according to an embodiment of the present invention.

FIG. 5 shows another example of a combinatory logic 77 of exploitation of the results of content-addressable memory tables of a circuit 7.

The existence of three different rules applied to different program groups is assumed.

A first rule (for example, the access to private data) is monitored for the first four programs (the first four lines of the tables). The logic then for example follows that illustrated in FIG. 4 with four AND gates 811 to 814 respectively receiving bits hit1_P to hit4_P and the inverses (inverters 821 to 824) of bits hit1_I to hit4_I, and four AND gates 831' to 834' combining the respective results of gates 811 to 814 with bit LD.ST. For simplification, the respective bits of validation of the different rules for the different programs have not been taken into account. The outputs of gates 831' to 834' each provide a bit indicative of a violation of the first rule by programs 1 to 4 and these four bits are combined by an OR gate 841 which indicates the possible violation of the first rule by any one of programs 1 to 4.

A second rule verifies, for the third and fifth programs (lines 3 and 5), that the current instruction attempts to access to data which are associated therewith, provided for the data to be in one of the private, reserved, or shared data areas or in one of the assigned peripherals. Two four-input NOR-type gates 853 and 855 respectively receive bits hit3_P, hit3_R, hit3_S, hit3_per, and hit5_P, hit5_R, hit5_S, and hit5_per. The respective outputs of gates 853 and 855 are combined by AND-type gates 863 and 865 with bits hit3_I and hit5_I, having their respective outputs combined by AND-type gates 873 and 875 with bit LD/ST. The outputs of gates 873 and 875 respectively provide a bit indicative of a violation of the second rule by programs 3 and 5 and these two bits are combined by an OR-type gate 842 which indicates the possible violation of the second rule by any one of programs 3 and 5.

A third rule verifies that the data reserved for the third program are called either by the operating system while it is in supervisor mode and acts on account of program 3, or from the instruction area of the third program. An AND-type gate 883 combines bits hit3_ASID and NU/S. Its output is combined by a NOR-type gate 893 with bit hit3_I and the output of gate 893 is combined by an AND-type gate 903 with bit hit3_R. The output of gate 903 is combined with bit LD/ST by an AND-type gate 913 having its output providing a bit indicative of a violation of the third rule. Taking the example of filling of the content-addressable memory of FIG. 3, the five monitored programs correspond to programs number 017, 001, 002, 100, and 012 which share the operating unit. The three programs 013, 014, and 015 are not taken into account (bits VALID of lines L6 to L8 at state 0).

An XOR-type gate 92 combines the respective outputs of gates 841, 842, and 913 to provide bit DECID indicative of a violation of one of the monitored rules.

Here again, it is possible to respect a similar architecture for each line according to the rules to be applied. In particular, each of the eight programs can be monitored from the point of view of each of the rules by using validation and configuration bits (table 78) based on a logic circuit having eight groups of gates 82*i*, 811, 83*i* (i ranging from 1 to 8) for the first rule, eight groups of gates 85*i*, 86*i*, and 87*i* for the second rule, and eight groups of gates 88*i*, 89*i*, 90*i*, and 91*i* for the third rule, the results being combined by eight-input OR-type gates 841, 842 for the first two rules, and 843 (not shown) for the third rule.

Other combinatory logics may be provided while respecting all or part of the described functionalities, and by making a compromise between the desired flexibility and versatility for the access control circuit and the complexity of its structure and of its programming.

In a simplified embodiment, circuit 7 comprises a single line. On each change of task, the circuit 7 is then parameterized according to the application to be executed. The switching between two applications risks being a little slower due to this parameterizing need which requires passing to a more secure mode. However, the structure and the consumption of the access control circuit are simpler.

An advantage of circuit 7 is that it enables controlling the access to data loaded into an execution memory of a processor, without taking resources from the operating system and transparently for the execution.

Another advantage is that it is compatible with different configuration modes according, for example, to the system in which it is to be installed, the required security level, the programming capacities, etc.

Although the first aspect has been described in relation with an example of data loading (LOAD) and storage (STORE) instructions, it more generally applies to any instruction for accessing data in the memory to be controlled (for example, erase instructions—ERASE, DELETE, etc.) and whatever the designation of these instructions (for example, READ, WRITE, etc.).

Figure 7A:
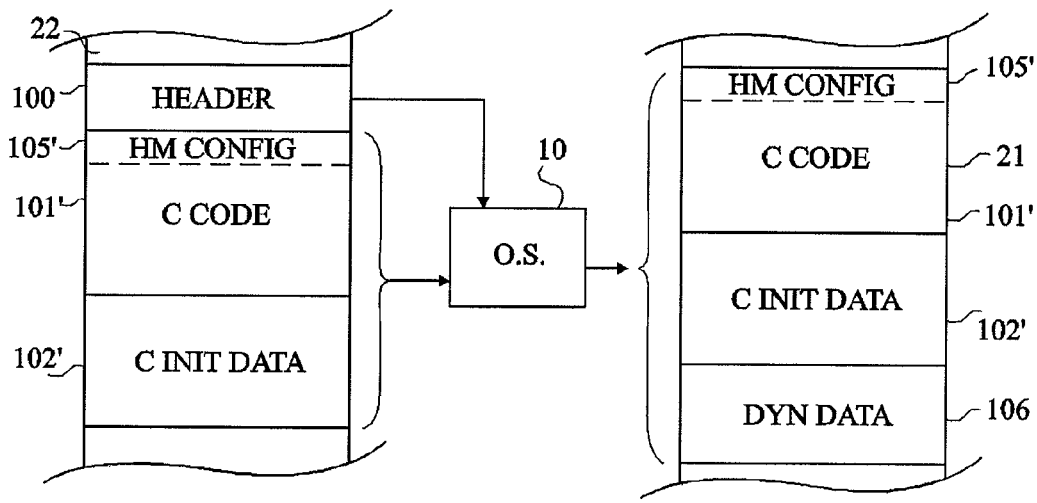
FIGS. 7A and 7B schematically illustrate the loading of a program into an execution memory according to the embodiment of FIG. 6.
Figure 7B:
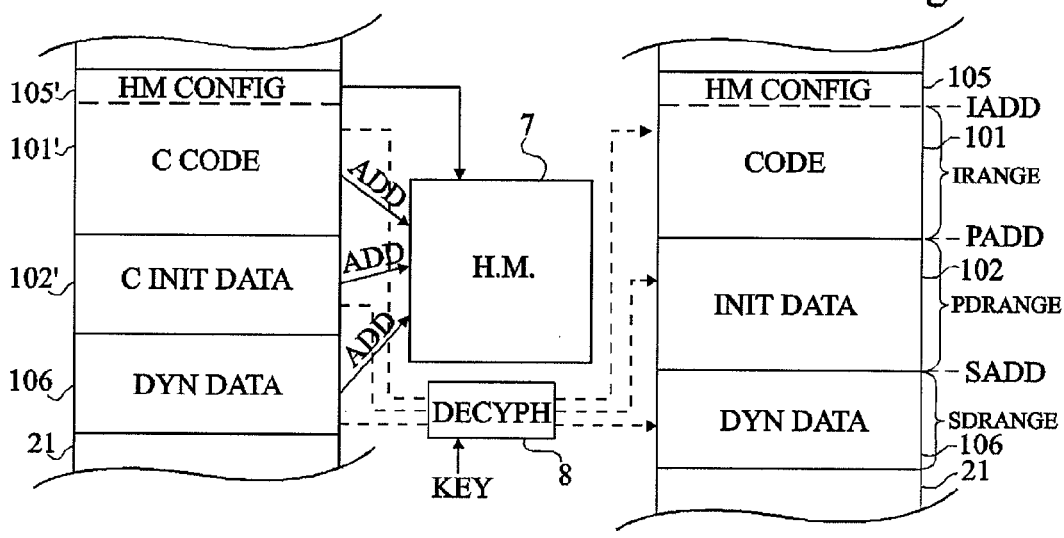

FIGS. 6, 7A, and 7B illustrate an embodiment of the second aspect for a parameterizing of a circuit for controlling the access to areas of an execution memory 21, for example, access control circuit 7 of the first aspect.

FIG. 6 partially illustrates two memories 9 and 22, for example, the memory of an external system and mass storage 22 of the computer equipment, for example of the type shown in FIG. 1, on coding of a program so that it is capable of being executed in the computer system. This operation may be performed towards another support than memory 22 and the coded program is transferred to mass storage 22 in an operation called installation which comprises transferring the program from a support, for example, a CDROM or a distant server (for example, via the Internet), towards mass storage 22 (for example, a hard disk or an EPROM memory) associated with execution unit 1.

Typically, a program or an application comprises at least three portions respectively containing header data 101 (HEADER) containing data necessary to the operating system of processing unit 1 to load program code 101 (CODE), that is, the program instruction lines and initialization data 102 (INIT DATA).

According to this embodiment, in a trusted external environment (for example, the operator providing the equipment to the user, the equipment manufacturer, etc.), a computer system implements a function of cyphered coding (block 3, CYPH CODE) of program code 101 and initialization data 102 for their transfer towards memory 22. The program is thus provided to memory 22 in cyphered form with part of the configuration data of the access control circuit. This requires for the architecture of control circuit 7 to be known by the coding tool so that it can generate configuration data HM CONFIG.

Function 3 uses a cyphering key KEY to cypher the transferred data except for the header data (portion 100) and generates data (portion 105, HM CONFIG) of configuration of control circuit 7 which will then be used on each loading of the program for execution. The data contain, among others, program instructions and data (starting code). Configuration data HM CONFIG are themselves preferably cyphered with key KEY or by another symmetrical or asymmetrical cyphering mechanism so that they are not directly accessible by the operating system. At this stage, only the header data (including the address of the input point in the program) are interpretable with no decyphering by the operating system.

As a variation, function 3 is ensured by the operating system in a specific operating mode (for example, supervisor) or uses a secondary processor.

On loading (FIG. 7A) of the program into execution memory 21 of unit 1, the operating system (symbolized by a block 10—O.S.) reads uncyphered header data 100, which enables it to transfer, without decyphering them, the data of the other portions 105', 101', and 102' into one or several portions of execution memory 21. Further, the header generally contains data enabling the operating system to define one or several portions 106 intended to receive dynamic data exploited during the program execution. In fact, the cyphered program is loaded by the operating system like any normal application. For simplification, only two portions INIT DATA and DYN DATA are considered without specifying that these are private, reserved, or shared data. The classification of these data depends on the program and on the field of application and will of course, if need be, be taken into account for the configuration of circuit 7.

FIG. 7B illustrates the system operation on first execution of the program present in execution memory 21.

The execution starts with the instructions of portion 105' for configuring the control circuit. Such instructions contain a call to a specific sub-program for extracting, by means of the operating system, data about the program (among others, the physical addresses) and providing a trusted agent with equipment (security coprocessor, secure mode, etc.) using key KEY and other data for decyphering (block 8, DECYPH) the data of portions 105', 101', and 102' and replacing the cyphered content with the verbose content, having configured control circuit 7 (H.M.) which will prevent any call by an unauthorized program. Addresses ADD of the data of portions 101', 102', and 106 are used to fill in the tables of content-addressable memory 75 of circuit 7 and the configuration data 105' enables setting the other conditions (associated peripherals, parameterizing of logic 77 for the concerned program, etc.). At the end of this step, the program and its data are found verbose in memory 21 (portions 105, 101, 102, 106).

As long as the program remains in memory 21 and its access is controlled by circuit 7, the operating is such as previously explained in relation with FIGS. 1 to 5.

According to whether execution memory 21 is or not accessible by unit 1 only, it may be useful to be able to free this memory for another program. Thereby, the configuration data are preferably held in memory 21 after the loading to be able to subsequently cypher again the critical portions before freeing the control circuit. A subsequent decyphering is then required on each loading of the concerned program.

Although the embodiment of FIG. 6 has been described in relation with the access control circuit of FIGS. 2 to 5, it also applies to the configuration of other configurable access control circuits, for example, the circuit described in above-mentioned patent application US-A-2005/0028004. In this last case, only the instruction areas will be controlled.

Figure 8:
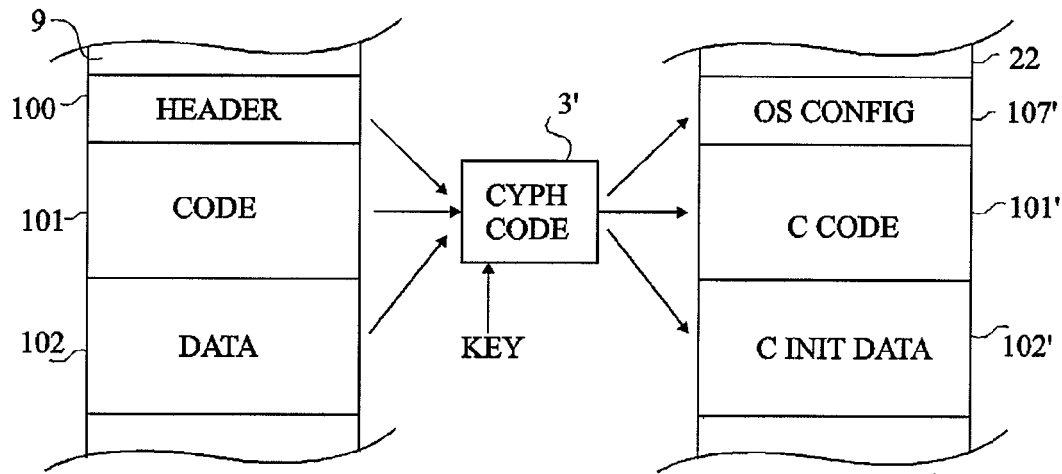
FIG. 8 schematically illustrates an example of processing of a program according to another embodiment of the second aspect of the present invention.

FIG. 8 illustrates another embodiment of the program loading method according to the second aspect. This embodiment is more specifically intended for a system provided with at least two operating modes of its operating system (for example, secure and open) and for execution memories provided with a controller of the access to specific areas.

As for the first embodiment (FIG. 6), the program coding in a non-volatile memory 22 of the system, be it from another non-volatile memory 22 or from a distant system, comes along with a cyphering (block 3', CYPH CODE) of portions 101 and 102 containing the program code and initialization data. Here, the generation of cyphered data of configuration of the control circuit associated with the processing unit is replaced with cyphered data (portion 107') of configuration of the memory controllers. The cyphering is performed, for example, by a secure portion of the operating system or before being introduced into the system.

Figure 9:
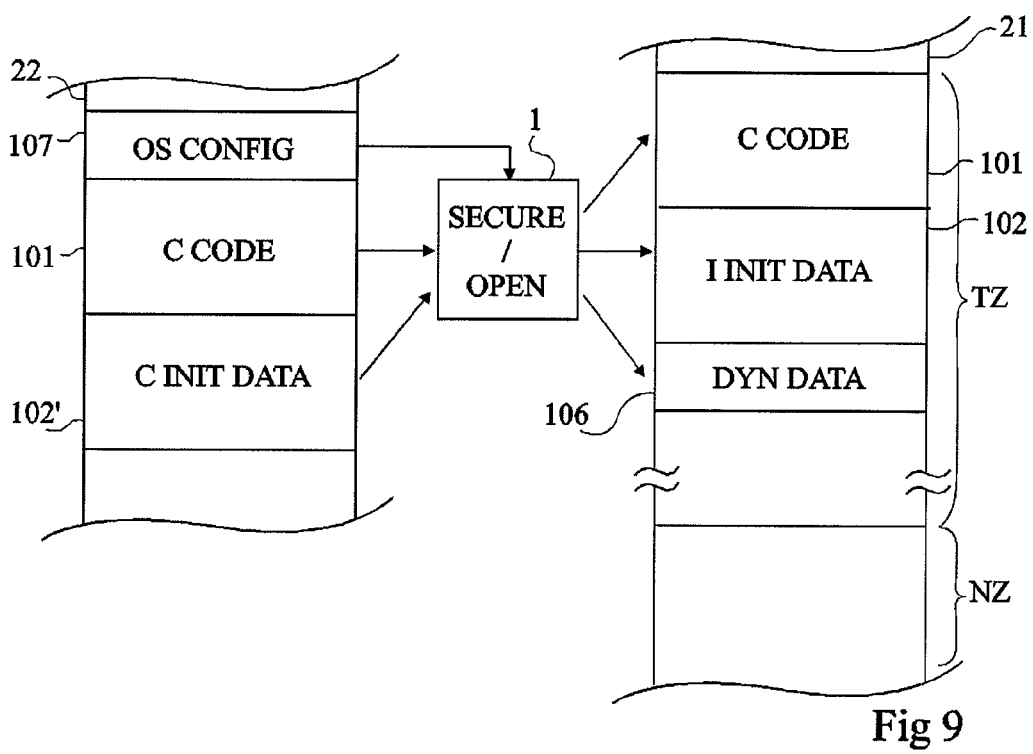
FIG. 9 schematically illustrates the loading of a program into an execution memory according to the embodiment of FIG. 8.

FIG. 9 illustrates the operation of this embodiment on first loading into the execution memory of the program stored in memory 22. The configuration data 107' contain an instruction of call to the secure operating system (SECURE). Once processor 1 has switched to the secure mode, it is capable of decyphering the configuration data OS CONFIG, program code CODE and initialization data INIT DATA. The configuration data are used to define memory areas assigned to this program in areas considered as secure TZ of an execution memory 21 of the system possibly containing non-secure areas NTZ. The secure areas are only accessible when the processing unit operates under its secure operating system. Preferably, the secure areas belong to areas which are not likely to be transferred to temporary areas of a mass storage (for example, temporary areas of a hard disk) intended to virtually increase the execution memory.

Figure 10:
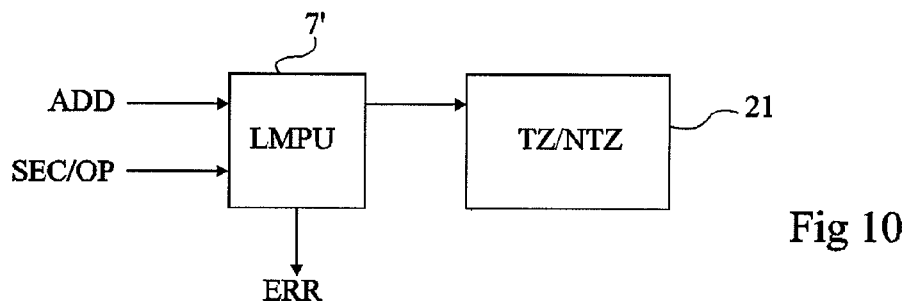
FIG. 10 shows an example of an access control circuit according to the embodiment of FIGS. 8 and 9.

FIG. 10 illustrates an example of embodiment of the system of FIGS. 8 and 9 on execution of the programs. Each time an address ADD is present on a memory bus (4, 5, FIG. 1), this address is filtered by a circuit 7' (LMPU) for controlling the access to the secure areas. Circuit 7' is, for example, a circuit known as a local memory protection unit or firewall (for example, known under trade name Trust Zone Memory Access—TZMA) which ensures, for the addresses belonging to a defined range, that unit 1 is in secure mode (bit SEC/OP). If so, the address is transferred to memory 21 for the extraction of the instruction or data. Otherwise, it is blocked by this circuit which, preferably, will further provide a bit (ERR) notifying an access violation attempt. As compared with the architecture of FIG. 1, such a circuit is, for example, located between buses 4 and 5 and memory 21. As a variation, circuit 7' corresponds to a simplified embodiment of the access control circuit of FIGS. 1 to 5 which only verifies, by means of a content-addressable memory, whether the current address requires for the secure operating system to block or not the access to the address.

An advantage of the second aspect of the present invention is that it does not require modifying the secure operating system to process a new program.

An example of application of the present invention relates to the terminals of management of rights of access to digital contents (for example, terminals known as SetTopBox).

Another example of application of the present invention relates to terminals or computers likely to download other applications (for example, games) on a communication network (for example, the Internet).

Of course, the present invention is likely to have various alterations, modifications, and improvements which will readily occur to those skilled in the art. In particular, although it has been described in relation with a single memory having areas to be protected, it more generally applies whatever the number of memories in which the controlled access data are present. Further, although the present invention has been described in relation with a so-called Harvard architecture, having two separate buses 4 and 5 for the instructions and the data, it also applies to so-called Von Neuman architecture, with a common bus for the instructions and data. It is enough for processing unit 1 to provide access control unit 7 with a signal indicating whether the access request relates to an instruction or to data.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A circuit for controlling access to at least one memory area accessible by a program execution unit, comprising:
   an instruction address input to receive at least one instruction address, the at least one instruction address comprising a memory address for an executable instruction;
   at least one data address input to receive at least one data address from the program execution unit;
   at least one circuit component configured to take as input the at least one instruction address and the at least one data address and determine whether the at least one instruction address and the at least one data address fulfill one or more conditions set by at least one correlation function, the at least one circuit component comprising at least one storage component configured to store information representing the at least one correlation function, wherein:
      the information representing the correlation function establishes a correspondence between each instruction address range in a plurality of instruction address ranges and at least one corresponding data address range;
      each instruction address range in the plurality of instruction address ranges is associated with a particular program and the correspondence established by the information representing the correlation function indicates that the particular program is permitted to access the at least one data address range corresponding to the instruction address range; and
      the circuit is configured to, in response to the particular program being loaded for execution by the program execution unit, update the information stored in the at least one storage component so that the at least one correlation function maps the instruction address range associated with the particular program to the corresponding data address range; and
   at least one output of a value indicative of whether the at least one instruction address and the at least one data address fulfill the one or more conditions set by the at least one correlation function.

2. The circuit of claim 1, wherein the at least one circuit component further comprises at least one wired logic, and wherein the at least one storage component comprises at least one content-addressable memory configured to:

receive the at least one instruction address and the at least one data address; and provide one or more correspondence bits to the at least one wired logic based at least in part on the at least one instruction address and the at least one data address.

3. The circuit of claim 2, wherein said at least one content-addressable memory comprises as many lines as there are instruction address ranges that the circuit is intended to control.

4. The circuit of claim 3, wherein said at least one content-addressable memory comprises several data address correspondence tables.

5. The circuit of claim 3, wherein said at least one content-addressable memory comprises at least one table of correspondence of peripherals accessible by each instruction address range.

6. The circuit of claim 3, wherein said at least one content-addressable memory comprises a table of identification of the particular program corresponding to each instruction range.

7. The circuit of claim 1, wherein the at least one correlation function is activated by a bit identifying an instruction of access to the at least one memory area to be monitored.

8. The circuit of claim 1, wherein the at least one correlation function takes into account an operating mode of the program execution unit.

9. A computer system comprising the circuit of claim 1.

10. The circuit of claim 1, wherein, for at least one instruction address range in the plurality of instruction address ranges, the at least one instruction address range is different from the at least one corresponding data address range.

11. At least one non-transitory computer-readable storage device storing at least one data structure for controlling access to at least one memory area accessible by a program execution unit, the at least one data structure comprising:
   at least one instruction address comprising a memory address for an executable instruction;
   at least one data address that is received from the program execution unit;
   at least one value indicative of whether the at least one instruction address and the at least one data address fulfill one or more conditions set by at least one correlation function; and
   information representing the at least one correlation function, wherein:
      the information representing the correlation function establishes a correspondence between each instruction address range in a plurality of instruction address ranges and at least one corresponding data address range;
      each instruction address range in the plurality of instruction address ranges is associated with a particular program and the correspondence established by the information representing the correlation function indicates that the particular program is permitted to access the at least one data address range corresponding to the instruction address range; and
      in response to the particular program being loaded for execution by the program execution unit, the information representing the at least one correlation function is updated so that the at least one correlation function maps the instruction address range associated with the particular program to the corresponding data address range.

12. The non-transitory computer-readable storage device of claim 11, wherein the information representing the at least one correlation function is stored in at least one content-addressable memory configured to:
   receive the at least one instruction address and the at least one data address; and
   provide one or more correspondence bits.

13. The non-transitory computer-readable storage device of claim 12, wherein the at least one content-addressable memory comprises as many lines as there are instruction address ranges that are to be controlled.

14. A method for monitoring access to one or more memory areas, the method comprising acts of:
   receiving instruction address information regarding at least one instruction address, the at least one instruction address comprising a memory address from which an instruction of a program is retrieved by at least one processor for execution;
   receiving data address information regarding at least one data address from which data is to be accessed by the at least one processor in connection with executing the instruction; and
   determining, by a hardware monitor, whether the program is permitted to access the data from the at least one data address based at least in part on the instruction address information and the data address information, wherein the act of determining comprises:
      identifying at least one instruction memory area to which the at least one instruction address belongs, the at least one instruction memory area being associated with the program;
      identifying at least one data memory area to which the at least one data address belongs; and
      using at least one hardware component of the hardware monitor to determine whether the identified at least one instruction memory area corresponds to the identified at least one data memory area, wherein a correspondence determined by the at least one hardware component between the at least one instruction memory area associated with the program and the at least one data memory area indicates that the program is permitted to access the at least one data memory area.

15. An apparatus for monitoring access to one or more memory areas, the apparatus comprising:
   an instruction address input to receive instruction address information regarding at least one instruction address, the at least one instruction address comprising a memory address from which an instruction is retrieved by at least one processor for execution;
   a data address input to receive data address information regarding at least one data address from which data is to be accessed by the at least one processor in connection with executing the instruction; and
   a hardware monitor to process the instruction address information and the data address information to determine whether the instruction is permitted to access the data from the at least one data address, wherein the hardware monitor is configured to:
      identify at least one instruction memory area to which the at least one instruction address belongs, the at least one instruction memory area being associated with a program;
      identify at least one data memory area to which the at least one data address belongs; and
      use at least one hardware component of the hardware monitor to determine whether the identified at least one instruction memory area corresponds to the identified at least one data memory area, wherein a correspondence determined by the at least one hardware component between the at least one instruction memory area associated with the program and the at least one data memory area indicates that the program is permitted to access the at least one data memory area.

16. The apparatus of claim 15, wherein the instruction address information comprises the at least one instruction address and the data address information comprises the at least one data address, and wherein the hardware monitor comprises at least one content-addressable memory configured to:
- map the at least one instruction address to at least one first identifier identifying the at least one instruction memory area comprising the at least one instruction address; and
- map the at least one data address to at least one second identifier identifying the at least one data memory area comprising the at least one data address, wherein the hardware monitor further comprises a hardware logic configured to map the at least one first identifier and the at least one second identifier to a value indicative of whether the program corresponding to the at least one instruction memory area is permitted to access the at least one data memory area.

17. An apparatus for monitoring access to one or more memory areas, the apparatus comprising:
- an instruction address input to receive instruction address information regarding at least one instruction address, the at least one instruction address comprising a memory address from which an instruction is retrieved by at least one processor for execution;
- a data address input to receive data address information regarding at least one data address from which data is to be accessed by the at least one processor in connection with executing the instruction; and
- means for processing the instruction address information and the data address information to determine whether the instruction is permitted to access the data from the at least one data address at least in part by:
  - identifying at least one instruction memory area to which the at least one instruction address belongs, the at least one instruction memory area being associated with a program;
  - identifying at least one data memory area to which the at least one data address belongs; and
  - using at least one hardware component of the hardware monitor to determine whether the identified at least one instruction memory area corresponds to the identified at least one data memory area, wherein a correspondence determined by the at least one hardware component between the at least one instruction memory area associated with the program and the at least one data memory area indicates that the program is permitted to access the at least one data memory area.

18. An apparatus for monitoring access to one or more memory areas, the apparatus comprising:
- an instruction address input to receive at least one instruction address, the at least one instruction address comprising a memory address from which an instruction is retrieved by at least one processor for execution;
- a data address input to receive at least one data address from which data is to be accessed by the at least one processor in connection with executing the instruction;
- means for mapping the at least one instruction address to at least one first identifier identifying at least one first memory area comprising the at least one instruction address, the at least one first memory area corresponding to a particular program, and for mapping the at least one data address to at least one second identifier identifying at least one second memory area comprising the at least one data address; and
- a hardware logic configured to determine whether the at least one first identifier identifying at least one first memory area corresponds to the at least one second identifier identifying at least one second memory area, wherein a correspondence determined by the hardware logic between the at least one first identifier identifying the at least one first memory area and the at least one second identifier indicates that the particular program corresponding to the at least one first memory area is permitted to access the at least one second memory area.

* * * * *

UNITED STATES PATENT AND TRADEMARK OFFICE
CERTIFICATE OF CORRECTION

PATENT NO. : 8,782,367 B2
APPLICATION NO. : 11/958958
DATED : July 15, 2014
INVENTOR(S) : Stéphan Courcambeck et al.

It is certified that error appears in the above-identified patent and that said Letters Patent is hereby corrected as shown below:

In the Specification

In column 9, line 6, "811" should read --81i--.

Signed and Sealed this
Seventh Day of October, 2014

Michelle K. Lee
*Deputy Director of the United States Patent and Trademark Office*